April 12, 1966  J. D. FLEXON ETAL  3,245,830
GLASS FURNACE TREATMENT
Filed April 30, 1962
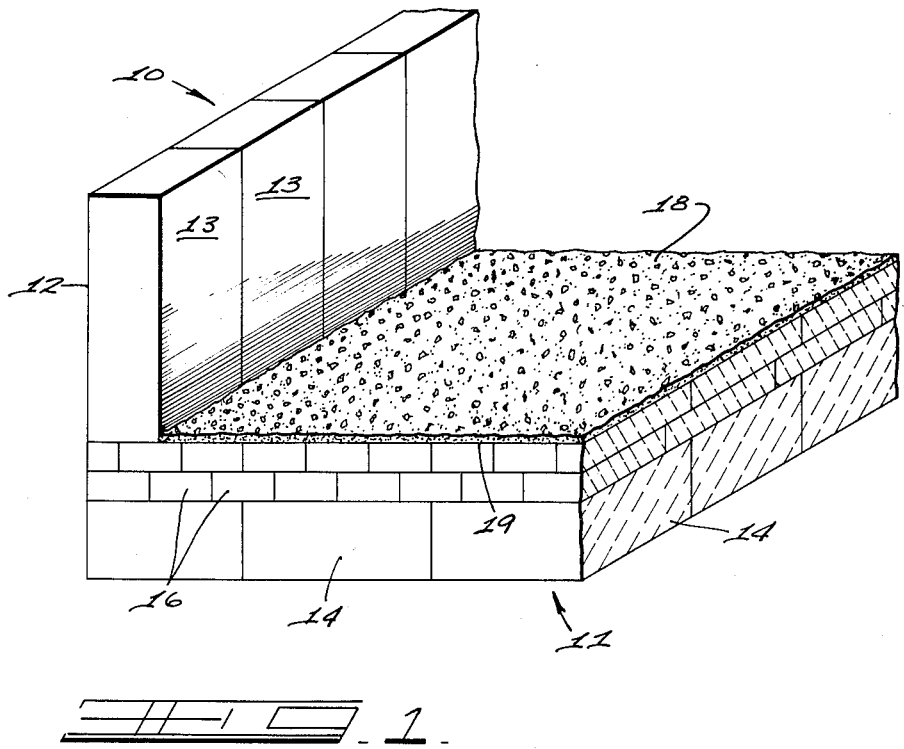
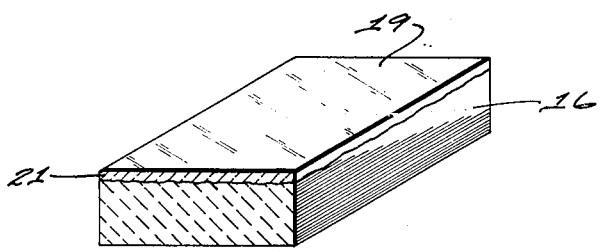
INVENTORS
JOHN D. FLEXON &
BY HENRY N. TROY
J. R. Nelson and
W. A. Schaich
ATTORNEYS

United States Patent Office 3,245,830
Patented Apr. 12, 1966

3,245,830
GLASS FURNACE TREATMENT
John D. Flexon, Charlotte, N.C., and Henry N. Troy, Toledo, Ohio, assignors to Owens-Illinois, Inc., a corporation of Ohio
Filed Apr. 30, 1962, Ser. No. 190,875
9 Claims. (Cl. 117—118)

The present invention relates to the manufacture of glass. More particularly, the present invention relates to the melting step in the operation of converting glass forming ingredients to finished consumer articles. Even more particularly, the present invention relates to a glass furnace constructed of a particular refractory insulative component, e.g. zircon.

Zircon is a refractory having the formula $ZrSiO_4$. It is frequently desirable to use zircon refractory because it is eminently corrosion and temperature resistant. Consequently, furnace and other molten-glass containing vessels; for hearths and the like, utilizing zircon refractory, will be extremely long lived as compared to furnaces which are constructed of the other conventional refractory materials.

Unfortunately, it is found that the glass furnaces constructed of zircon refractory elements, particularly in the bottom walls thereof, are beset with the problem that considerable frothing and foaming of the molten glass occurs particularly during the first three to six months in which the furnace is put into operation. This frothing and foaming appears to be caused by the formation or release of gases occurring simultaneously with the reactions taking place in the formation of the mutually soluble silicates. This evolution of gases, evidenced in frothing or foaming, is very undesirable because in most cases it becomes so violent that the contents, e.g. the molten glass of the furnace, are thrown from the furnace melting chamber. Also the volume of molten glass, due to the formation of the gas, increases to such an extent that the contents overflow and run down the sides of the furnace. Naturally, this causes undesirable and unnecessary destruction of the furnace and various of its auxiliary equipment. It may also constitute a danger to operating personnel, repairmen and the like whose duties require their presence from time to time proximate the furnace.

One technique that has been employed to overcome the frothing, foaming and overflow problem is to operate the furnace at a lower heat input rate whereby the contents are fused to the molten state a slower rate, thus reducing the capacity of the furnace. The glass adjacent to the zircon is thus maintained at a lower temperature than normal. This technique is not particularly satisfactory, of course, since obviously it is economically unattractive and full use is not being made of the designed capacity of the furnace. Furthermore, the technique may not allow a proper fusion in accordance with preferred glass melting technique for the batch formulation charge.

Accordingly, it is an object of the present invention to provide a technique of operation in connection with glass furnaces formed of zircon refractory bottom which overcomes the foregoing problems.

It is a particular object of the present invention to provide a method of pre-treating the zircon refractory elements of the furnace bottom wall in such fashion that no violent evolution of gases or bubbles or consequent foaming, frothing or overflowing is encountered.

It is another object of the present invention to provide such a treatment which thereby permits a glass furnace, inclusive of its bottom wall, formed of zircon refractory to be operated from the outset at its full load capacity.

It is likewise an object of the present invention to provide a technique which permits the furnace having its bottom formed of zircon refractory to be operated at the normally desired elevated temperatures which are most eminently satisfactory for achieving the optimum in fusion and the forming of the mutually soluble silicates.

It is still another object of the present invention to provide a method of treating the bottom wall facing surfaces of zircon refractory elements, which method can be very conveniently carried out in any glass melting operation utilizing readily available materials and being capable of accomplishment with a maximum of convenience.

The foregoing and other objects of the present invention will become apparent to those skilled in the art from the following detailed description taken in conjunction with the annexed sheet of drawings on which there is presented, for purposes of illustration only, a simplified embodiment of the present invention.

In the drawings:

FIG. 1 is a perspective view schematically illustrating a glass furnace from which portions have been broken away in order to show the interior.

FIG. 2 is a perspective view of a single refractory block formed of zircon and serving to schematically illustrate the effect of the treatment in accordance with this invention.

Broadly speaking, the present invention constitutes the method wherein the inner surfaces of a furnace formed of zircon refractory, most particularly the bottom surface, are covered with certain alkali metal salts in granular form and in prescribed a mount whereupon the alkali metal salt is heated, for example, by start up of the furnace, to a prescribed temperature and the fused or melted salt held in contact with the surface of the zircon refractory element for about 5 hours. With certain of the alkali metal salts, which will be described more fully hereinafter, it is most desirable and in fact is necessary that the granular alkali metal salt be combined with and about equal weight of glass cullet also in finely divided form.

Referring now more particularly to the drawings, there is disclosed in FIG. 1 a furnace 10 composed of a bottom wall 11 and an upstanding side wall 12. The side walls are formed of conventional refractory blocks 13 arranged around the margin of the bottom wall 11 in side by side contacting relationship. The bottom wall is composed of a lowermost layer of blocks 14 formed of a clay flux or other refractory, or with suitable support structure. The bottom layer of blocks of the furnace may be entirely constructed of zircon refractory blocks 16. These form the support or bed for the furnace and are chosen for their relative low cost and relatively satisfactory insulative properties. Situated on top of the lowermost blocks of clay flux 14 are a double layer of smaller blocks 16 formed of zircon having the formula $ZrSiO_4$. These blocks 16 formed of zircon refractory are very highly corrosion and temperature resistant. As a consequence, molten glass formed therein or transported in channels formed of this refractory are not readily eaten away, either by the elevated temperatures at which the furnace operates to produce molten glass from the glass forming ingredients, nor by the physical erosion caused by the movement or flow of the glass forming ingredients or the molten glass in the furnace. It will be appreciated that the bottom wall of a molten-glass containing furnace or vessel is subjected to a serious wear and deterioration situation and, as a consequence, in the interest of economy only, the bottom wall of a glass furnace or other glass containing vessel are provided with the layer of zircon refractory blocks. In accordance with one stage of the method of the invention, a layer 18 of finely divided material is spread uniformly over the top surface 19 of the refractory blocks formed of zircon. The other steps of the process, in accordance with the invention, will be described shortly. FIG. 2 discloses a single refractory block 16 formed of zircon. Close examination of this block illustrated in FIG. 2 shows a top layer which extends about ⅛ to ¼ inch down from the top surface. This layer represents the portion of the block which has undergone a change in crystalline structure by reason of the carrying out of the treating method in accordance with this invention. The changed portion is identified by the reference numeral 21.

There will now be described an example illustrating a preferred technique for treating furnaces formed of zircon refractory elements in accordance with the present invention.

EXAMPLE I

A mixture of sodium carbonate and finely divided flint cullet, which has been so crushed that all of it will pass through a No. 5 mesh screen (a screen possessing 5 openings per inch of linear screen), is prepared in a suitable vessel. The mixture is so prepared that the sodium carbonate and flint cullet are present in equal weight proportions. This finely divided or granular mixture is spread evenly on the surface of a new glass furnace bottom formed of zircon refractory blocks or "paving," much in the fashion illustrated in FIG. 1. Care is taken that the mixture is spread uniformly, utilizing a tinged rake, to a depth of about 3/16 of an inch. Then the furnace is heated up or "fired" to bring the temperature of the furnace to 2500° F. This temperature is measured with the conventionally located thermocouples located at the crown of the furnace. The temperature proximate the surface of the zircon refractory element may be in the neighborhood of 2800° F. This temperature is maintained for 5 hours. The mixture should be spread, as described, to provide about one pound of the mixture of sodium carbonate and glass cullet per square foot of the melter bottom surface area. After the 5 hour period, the furnace is charged in the usual fashion with a full charge of glass forming ingredients, or batch. This charging, after being initiated, is continued at a rate in accordance with designed melting capacity of the furnace. The charge used is set forth in Table 1 below.

*Table 1*

| | | |
|---|---|---|
| Sand | lbs | 2000 |
| Soda ash | lbs | 613 |
| Flint cullet | lbs | 600 |
| High calcium limestone | lbs | 595 |
| Nepheline syenite | lbs | 386 |
| Gypsum (CaSO₄) | lbs | 22 |
| Fluorspar | lbs | 5 |
| Decolorizer | ozs | 12 |

Along with the mentioned charging, the fusing and melting of the ingredients proceeds in the furnace in conventional fashion.

In practicing the invention, as just described, it has been observed that melting and fusing of the glass under normal operating conditions produces no signs of any violent formation of any gas or bubbles and no troublesome frothing, foaming or overflowing.

It has also been noted by contrast that in the same type furnace wherein a glass melting operation, as just described, has been practiced without the treatment of the bottom wall with the sodium carbonate and glass cullet mixture, violent foaming occurred as the bottom temperature approached and went beyond 2600 F. and contents from the furnace melter chamber overflowed.

EXAMPLE II

The procedure, as described hereinabove, is repeated except that the layer of finely divided material is composed entirely of lithium carbonate and no glass cullet is used in forming a mixture therewith. The lithium carbonate in finely divided form is spread over the bottom of the furnace in such amount that there is present about 0.5 pound of lithium carbonate per one square foot of furnace bottom area. The effect of the treatment is much the same, as in the treatment described in Example I. Thus, the furnace is subsequently charged with glass forming ingredients and the melting operation is carried out in conventional fashion. Under normal operating temperatures for the furnace, there is no violent foaming or frothing and, hence, no furnace chamber overflow when using this procedure.

Other alkali metal salts which can be used in the practice of the present invention include potassium carbonate; sodium silicate, the metasilicate, the tetrasilicate and the disilicate; sodium hydroxide; also potassium disilicate, the metasilicate, tetrasilicate; potassium hydroxide; likewise lithium orthosilicate, lithium metasilicate and lithium hydroxide. The lithium salts, and particularly lithium carbonate, can be used per se and do not require the formation of a mixture therewith with glass cullet. However, use of these salts with the glass cullet reduces the time and temperature requirements for treating the bottom wall refractory in the furnace. The sodium and potassium salts, on the other hand, are most effective in their treatment when they are applied as a granular or finely divided mixture of the alkali metal salt with glass cullet. Most preferably, this mixture should range between about one part of alkali metal salt to three parts of glass cullet to three parts of the alkali metal salt to one part of glass cullet. Most ideally when using the sodium and potassium salts, the mixture of the salt with the glass cullet should measure about 50% by weight of each component.

The mixture of salt and cullet, where sodium and potassium salts are used, or the lithium salt alone should be applied as uniformly as possible over the area of zircon to be treated in order that the subsequent "firing" and fusion will provide sufficient quantity of the metal in the form $M_2O$, where M is either sodium, potassium or lithium, to the refractory. The temperature of "firing" is most desirably maintained at 2500° F. or higher for the entire 5 hour period (or longer) in order to facilitate and insure penetration of the fused salt into the pores or interstices of the zircon refractory body. The "firing" period must extend for at least about 5 hours. A longer period may be used but is usually not necessary. Preferably the penetration of the alkali metal salt will be in the form of the metal oxide silicate, e.g. $M_2OSiO_2$, particularly where cullet is present in the mixture as in the preferred practice of this invention. It is believed, and experience with the practice of the invention substantiates the fact, that the degree of penetration and the rate of penetration is enhanced by the use of the mixture of the specified salt and cullet. This is most probably due to the fact that the glassy silicate is physically more reactive with the refractory composition than the fused salt alone. However, for some unknown reason this factor is not controlling in the case of the lithium salt.

The cullet for use in forming the pre-treatment mixture, in accordance with the practice of this invention, should preferably be a cullet which has been so reduced in size either by grinding or crushing that the size of the particle is relatively uniform and most importantly is capable of passing through a 5 mesh screen. It has also been found, in accordance with the present invention, that the cullet should be of a good commercial quality, as used in glass plants.

Examination of a refractory block formed of zircon and which has been pre-treated in accordance with the present invention reveals an upper ¼ inch layer which is of changed structure. This change is evident to the naked eye and microscopic examination reveals that the zircon has undergone a change in its crystalline structure. It is observed that the zircon, $ZrSiO_4$, has converted to zirconia having the formula $ZrO_2$ and a glass phase. An analysis of the layer of a block (obtained from laboratory experiments) which is changed in structure, and especially is changed in crystalline structure, was analyzed for $Na_2O$ in order to determine how much of the salt or its fused by-product ($Na_2O$) had penetrated into the layer of the zircon refractory block. The analysis for Na₂O was conducted using the well known J. L. Smith fusion technique. Thus, the sample is granulated and fluxed in a J. L. Smith platinum crucible with the addition of calcium carbonate (CaCO₃) an ammonium chloride (NH₄Cl). When the sample is fused, the alkali is extracted with water in the form of sodium chloride (NaCl). The sodium content of the latter is then determined by flame photometry using a spectrophotometer with a hydrogen-oxygen burner. The average of several determinations revealed that the layer of the block, which had undergone a change, measured 6.5 to 6.7% Na₂O based on the weight of the layer taken as a sample and representing that portion which had undergone a change visible to the naked eye. Normally, a new zircon refractory block, as acquired for example from Charles Taylor & Sons of Cincinnati, Ohio; Corhart Refractory Company of Louisville, Kentucky; The H. K. Porter Company of St. Louis, Missouri; when analyzed by the same test as described, yields only traces of Na₂O and is essentially 98% ZrSiO₄. Generally, it is preferred that the treatment afforded by the practice of the present invention results in a refractory block having a surface layer which contains at least 5% by weight M₂O, wherein M is sodium, potassium or lithium.

The change in the crystalline structure of about ¼ inch depth thickness of the refractory block is a permanent one. Furnaces composed of a glass melter bottom formed of the zircon refractory and treated as described above have been run for periods of several months with only the usual amount of down time without revealing any evidence of foaming or frothing.

Exactly why the treatment, in accordance with the present invention, prevents the frothing, foaming and bubbling over of the glass forming ingredient is not known. Furthermore, while there is no desire nor any intent to be bound by any theory or explanation of the manner in which the treatment may be effective, it is suspected that the phenomena is the following. It is known that the zircon refractory block as acquired from the manufacturer is composed essentially of ZrSiO₄. The molten glass contained in a vessel, e.g. furnace, in contact with the zircon, normally contains Na₂O. However, the latter is used up quickly in converting the zircon, ZrSiO₄, to zirconia having the formula ZrO₂. If this in fact occurs, the molten glass will have a Na₂O level which is below its normal level, as established by the batch charge. As a consequence, the sulphates which are usually present in the glass forming ingredients may become insoluble by reason of the lowering of the level of Na₂O. As a result, these sulfates are given off rather violently as a gas, causing thereby the frothing, foaming and bubbling over of the molten glass.

In summation, it can be seen from the foregoing description that we have provided a novel and convenient method of pre-treating the zircon refractory portion of a glass melting furnace or the like, utilizing a unique combination of easily obtainable materials applied in a prescribed manner whereby subsequent use of the furnace is not troubled by frothing and foaming and/or overflowing.

Modifications may be resorted to without departing from the spirit and scope of the invention as defined in the appended claims.

We claim:

1. The method of treating the bottom wall of a glass melting furnace, said wall being formed of juxtaposed blocks of zircon refractory, said method comprising:
    applying a covering layer of an alkali metal salt over the entire upper surface of said wall, said alkali metal being selected from the group consisting of sodium, potassium, lithium or mixtures thereof, and
    heating said furnace sufficiently at a temperature of not less than 2500° F. as to fuse said salt, effect penetration of the fused salt into the pores of said zircon refractory and thereby form a monolithic upper surface layer extending over all of said juxtaposed blocks, said surface layer including zirconia (ZrO₂), a glass phase and at least 5% by weight of the alkali metal salt, expressed as M₂O, wherein M is sodium, potassium, lithium or mixtures thereof.

2. The method as claimed in claim 1, wherein said salt is selected from the group consisting of sodium, potassium and lithium carbonates, silicates, hydroxides and mixtures thereof.

3. The method as claimed in claim 2, wherein said salt coverage provides about one-half pound thereof per square foot of upper surface.

4. The method as claimed in claim 1, wherein said salt forming the covering layer is one of lithium carbonate, lithium silicate, lithium hydroxide or mixtures thereof.

5. The method of treating the bottom wall of a glass melting furnace, said wall being formed of juxtaposed blocks of zircon refractory, said method comprising:
    applying a covering layer of a mixture of cullet and an alkali metal salt over the entire upper surface of said wall, said metal being selected from the group consisting of sodium and potassium, and
    heating said furnace sufficiently at a temperature of not less than 2500° F. as to fuse said salt, effect penetration of the fused salt into the pores of said zircon refractory and thereby form a monolithic upper surface layer extending over all of said juxtaposed blocks, said layer including zirconia (ZrO₂), a glass phase, and at least 5% by weight of the alkali metal salt expressed as M₂O, wherein M is sodium, potassium or mixtures thereof.

6. The method as claimed in claim 5, wherein said cullet and salt are present in about equal weight proportions.

7. The method as claimed in claim 5, wherein said cullet is capable of passing a No. 5 mesh screen.

8. The method as claimed in claim 7, wherein said salt is selected from the group consisting of carbonates, silicates, hydroxides and mixtures thereof.

9. The method as claimed in claim 8, wherein said monolithic surface layer measures at least about ¼ inch.

References Cited by the Examiner

UNITED STATES PATENTS

| | | | |
|---|---|---|---|
| 1,653,918 | 12/1927 | Martin | 117—123 |
| 1,797,780 | 3/1931 | Malherbe | 117—123 |
| 2,169,384 | 8/1939 | Hall | 117—123 |
| 2,290,911 | 7/1942 | Jones | 117—118 |
| 2,666,975 | 1/1954 | Govan | 117—125 |
| 2,717,840 | 9/1955 | Bosch | 117—123 |
| 2,771,376 | 11/1956 | Capellman | 65—372 |
| 2,777,254 | 1/1957 | Siefert et al. | 65—374 |
| 2,779,136 | 1/1957 | Hood et al. | 117—118 |
| 2,818,354 | 12/1957 | Pritikin et al. | 117—125 |
| 2,900,764 | 8/1959 | Long | 65—347 |
| 2,919,209 | 12/1959 | Bossard | 117—123 |
| 3,020,182 | 2/1962 | Daniels | 117—125 |

FOREIGN PATENTS

| | | |
|---|---|---|
| 139,714 | 8/1948 | Australia. |
| 1,062,691 | 4/1954 | France. |
| 934,693 | 11/1955 | Germany. |
| 1,047,103 | 12/1958 | Germany. |
| 1,085,087 | 7/1960 | Germany. |

RICHARD D. NEVIUS, *Primary Examiner.*